No. 635,253. Patented Oct. 17, 1899.
F. E. IVES.
PHOTOCHROMOSCOPE AND PHOTOCHROMOSCOPE CAMERA.
(Application filed May 1, 1899.)
(No Model.)

Witnesses:-
Hamilton D. Turner.
Louis K. Hohkheed

Inventor:-
Frederic E. Ives.
by his Attorneys:
Howson & Howson

UNITED STATES PATENT OFFICE.

FREDERIC EUGENE IVES, OF PHILADELPHIA, PENNSYLVANIA.

PHOTOCHROMOSCOPE OR PHOTOCHROMOSCOPE-CAMERA.

SPECIFICATION forming part of Letters Patent No. 635,253, dated October 17, 1899.

Application filed May 1, 1899. Serial No. 715,229. (No model.)

*To all whom it may concern:*

Be it known that I, FREDERIC EUGENE IVES, a citizen of the United States, residing in Philadelphia, Pennsylvania, have invented certain Improvements in Photochromoscopes or Photochromoscope-Cameras, of which the following is a specification.

My invention consists of a certain improvement in photochromoscopes or photochromoscope-cameras, more especially in that for which I obtained Letters Patent of the United States No. 531,040, dated December 18, 1894, the object of my present invention being to introduce in a reflected image or images a distortion corresponding to that produced in a transmitted image or images by reason of the inclination of the transparent mirror or mirrors interposed in the path of the rays of light from such image or images and to accomplish this without special treatment or formation of the transparent mirrors. This object I attain in the manner hereinafter set forth, reference being had to the accompanying drawings, in which—

Figure 1:
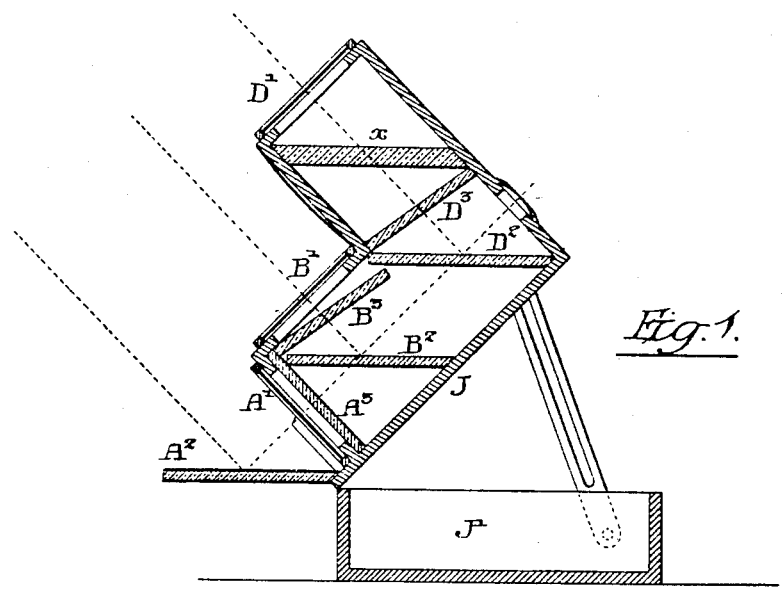
Figure 2:
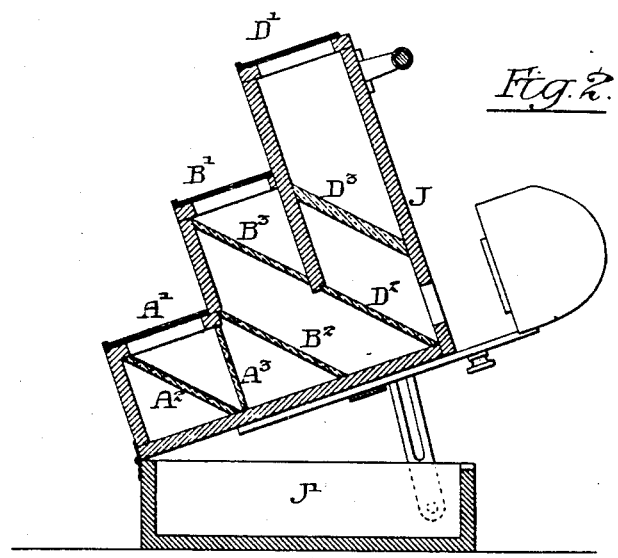

Figure 1 represents in vertical section a photochromoscope instrument in which my present invention is embodied; and Fig. 2 is a similar view of another form of photochromoscope instrument, illustrating another embodiment of my invention.

In the instrument shown in Fig. 1, J represents a casing, which is preferably hinged at the front lower corner to the front of a box J' or other base, on which, by means of a suitable strut and set-screw, the casing may be adjusted at the best angle for properly transmitting the light.

When the instrument is used for viewing a chromogram, the three sections of the chromogram A', B', and D' are disposed, respectively, in front of and above openings in the casing of the instrument, as shown in the drawings, the light passing directly through the sections B' and D' of the chromogram and being reflected through the section A' by means of an external mirror $A^2$. Within the casing of the instrument are the color-screens $A^3$, $B^3$, and $D^3$ and the inclined transparent mirrors $B^2$ and $D^2$, the mirror $B^2$ reflecting the rays of light which pass through the image or section of the chromogram B' and transmitting the rays which are reflected by the mirror $A^2$ through the image or section of the chromogram A', while the mirror $D^2$ reflects the rays which pass through the image or section of the chromogram D' and transmits the rays reflected from the mirrors $A^2$ and $B^2$. When the instrument is used as a camera, the light of course travels in the opposite direction and forms images at A', B', and D', respectively, sensitive plates of course taking the place of the chromograms.

In the original instrument of this character the inclination of the transparent reflectors necessary to secure an optical superposition of the different images to the eye caused a distortion of the image seen by the transmitted rays, owing to the different angles at which different portions of the cone of light entered the surface of the transmitting-mirrors and to the consequent differences of refraction, the effect, if the mirrors had plane parallel surfaces, being that the image transmitted through $D^2$ from $B^2$ and that transmitted through both $B^2$ and $D^2$ appeared perpendicularly elongated to a slight extent sufficient to prevent all of the details of the picture from registering accurately with the same details in the image which was simply reflected from $D^2$. In the camera a reverse effect resulted—that is to say, the images formed by reflection and transmission appeared perpendicularly shortened as compared with that which was simply reflected. This defect can be corrected by employing transparent mirrors which instead of having plane surfaces exactly parallel to each other are slightly wedge-shaped and so disposed that the lowest part of the picture seen through the mirror appears optically displaced upward, while the displacement appears less and less toward the top, where the inclination of the transparent mirror brings it closer and closer to the photographic image or where in a camera the reverse effect results. The preparation of suitably-wedged mirrors with certainty is, however, difficult and costly, and in Letters Patent No. 622,480, granted to me on the 4th day of April, 1899, I described and claimed a method of distorting the figure of the reflecting-surface of the transparent mirror by the application of local pressure thereto by means of springs or other pressure devices.

My present invention comprises another method of overcoming the defect to which I have referred, and in that form of instrument shown in Fig. 1 it consists simply in locating between the primary mirror $D^2$ of the instrument and the image D' through which the rays pass to said mirror a plate or sheet of glass $x$ inclined in such a manner as to cause distortion of the image D' equivalent to the distortion of the image A' after it has passed through the mirror $D^2$. It may be said that this provision for counterbalancing the distortion of the image A' by the inclined transmitting-mirrors would more than counterbalance the distortion of the image B', owing to the fact that this latter image is transmitted through but one inclined mirror; but this is unimportant if the image B' is that of the blue sensation, for it has been found in practice that this image has less noticeable effects of definition in the composite image than the images of the red and green sensations. Hence the slight overcorrection of the red image as compared with the blue image is comparatively unimportant. Nevertheless, in certain forms of photochromoscope or photochromoscope-camera a properly formed and inclined glass may be inserted under the image B', or instead of using a special inclined transparent plate I may make and incline the color screen or screens so as to obtain the same result. These embodiments of the invention are illustrated in Fig. 2, in which $B^3$ and $D^3$ represent color-screens thus disposed in respect to the inclined transparent mirrors $B^2$ and $D^2$. In this case also the mirrors $A^2$, $B^2$, and $D^2$ are disposed one behind another in the same axial line, and the box or casing has three steps, a chromogram or plate being disposed upon the top of each step. Assuming that the transparent reflectors have plane parallel surfaces, the compensating glass or glasses, if inclined at the same angle as the transparent reflectors, should be of a thickness substantially equal to that of the single mirror or to that of both mirrors whose distortion said compensating-glass is intended to correct, a greater thickness being necessary if the inclination is less and a less thickness if the inclination is greater.

It is evident that I may employ this device conjointly with that claimed in Patent No. 622,480, if desired.

Either of the instruments described may be used as a camera, the direction of the rays of light in such case being the reverse of that in the photochromoscope and sensitive plates taking the place of the chromograms.

Having thus described my invention, I claim and desire to secure by Letters Patent—

1. An instrument of the character described, having a series of inclined transparent mirrors and an inclined transparent distortion-correcting plate located in the path of the rays which are subject to reflection by the primary transparent mirror, the thickness of said correcting-plate being substantially equal to the combined thickness of the mirrors whose distortion it is to correct if its angle to the optical axis is the same, and greater or less than the combined thickness of said mirrors according as its angle to the optical axis is less or greater than that of said mirrors, whereby distortion of the image reflected by said primary mirror will be effected substantially proportionate to the distortion of the images transmitted therethrough.

2. An instrument of the character described having a series of inclined transparent mirrors and inclined transparent distortion-correcting plates located in the paths of the rays which are subject to reflection by first and second transparent mirrors of the series, the thickness of each correcting-plate being substantially equal to the thickness of the mirror or mirrors whose distortion it is to correct, if its angle to the optical axis is the same, and greater or less than the thickness of said mirror or mirrors, according as its angle to the optical axis is less or greater than that of said mirror or mirrors, whereby distortion of the image reflected by each transparent mirror will be effected substantially proportionate to the distortion of the image or images transmitted therethrough.

3. An instrument of the character described having a series of inclined transparent mirrors and an inclined transparent distortion-correcting plate colored so as to serve as a color-screen, said plate being located in the path of the rays which are subject to reflection by the primary transparent mirror and having a thickness substantially equal to the combined thickness of the mirrors whose distortion it is to correct if its angle to the optical axis is the same, and greater or less than the combined thickness of said mirrors according as its angle to the optical axis is less or greater than that of said mirrors, whereby distortion of the image reflected by said primary mirror will be effected substantially proportionate to the distortion of the images transmitted therethrough.

4. An instrument of the character described having a series of inclined transparent mirrors and inclined transparent distortion-correcting plates colored so as to serve also as color-screens, said plates being located in the paths of the rays which are subject to reflection by the first and second transparent mirrors of the series and each having a thickness substantially equal to the thickness of the mirror or mirrors whose distortion it is to correct, if its angle to the optical axis is the same, and greater or less than the thickness of said mirror or mirrors according as its angle to the optical axis is less or greater than that of said mirror or mirrors, whereby distortion of the image reflected by each transparent mirror will be effected substantially proportionate to the distortion of the image or images transmitted therethrough.

In testimony whereof I have signed my name to this specification in the presence of two subscribing witnesses.

FREDERIC EUGENE IVES.

Witnesses:
F. E. BECHTOLD,
JOS. H. KLEIN.